United States Patent [19]
Allen et al.

[11] 4,178,629
[45] Dec. 11, 1979

[54] D. C. POWERED A. C. SUPPLY FOR REACTIVE LOADS

[75] Inventors: George W. Allen, Rhinebeck; Bruce C. Felton, Saugerties, both of N.Y.

[73] Assignee: International Business Machines Corporation, Armonk, N.Y.

[21] Appl. No.: 913,142

[22] Filed: Jun. 6, 1978

Related U.S. Application Data

[63] Continuation of Ser. No. 772,784, Feb. 28, 1977, abandoned.

[51] Int. Cl.² ................... H02M 7/515; H02M 7/537
[52] U.S. Cl. ........................................ 363/96; 363/97
[58] Field of Search ................ 307/64, 66; 363/96, 363/97, 131, 135

[56] References Cited
U.S. PATENT DOCUMENTS

| | | | |
|---|---|---|---|
| 2,969,498 | 1/1961 | Stenudd | 323/22 |
| 3,581,212 | 5/1971 | McMurray | 363/43 |
| 3,636,430 | 1/1972 | Kernick et al. | 363/41 |
| 3,648,150 | 3/1972 | Kernick et al. | 363/41 |
| 3,875,496 | 4/1975 | Carsten | 363/97 |
| 3,986,098 | 10/1976 | Tamii et al. | 307/66 |
| 4,041,367 | 8/1977 | Gold et al. | 363/97 |

*Primary Examiner*—William M. Shoop
*Attorney, Agent, or Firm*—Frederick D. Poag

[57] ABSTRACT

The disclosed supply utilizes the capability of two-way power flow, from a DC source to the load and from the load to a DC source, so as to be able to track a desired output wave form while running reactive loads. This method of operation requires minimum filtering for loads of various power factors and transient characteristics. Two equal and opposite DC sources, such as batteries, furnish and accept current, through switches, to and from an inductor-capacitor filter to which the load is connected. A feed-back circuit compares the voltage furnished to the load with a reference of the desired output wave shape, so as to control the switches in such manner as to force the output voltage to follow that wave form.

8 Claims, 5 Drawing Figures

D. C. POWERED A. C. SUPPLY FOR REACTIVE LOADS

This is a continuation of application Ser. No. 772,784, filed Feb. 28, 1977, and now abandoned.

FIELD OF THE INVENTION

This invention relates to DC to AC power conversion and more particularly to means for supplying voltage of a predefined wave form from a DC source to an AC load, where the load may have reactive or transient characteristics tending to distort the delivered voltage wave form.

DESCRIPTION OF THE PRIOR ART

Provision of an "uninterruptible power supply" is important in many computer installations, as well as for other purposes. Typically, a bank of batteries is used in the DC portion of an AC/DC/AC supply where, as in computer installations, completely uninterrupted power is required. A diesel generator may be provided to keep the batteries charged if the public utility source is out of service for more than a few minutes but in any case the immediate source of energy during the public utility outage is the batteries. In a system of this kind, a DC/AC inverter is provided to convert the battery DC to power line frequency AC. However, most solid state inverter systems are incapable of powering a reactive and/or rapidly changing load efficiently and without distortion. This is because wave shape control is open loop and does not take into account reverse energy flow from the load. When a sinusoidal voltage is applied to a reactive load, there are times when the current flow to or from the load is opposite in polarity to the instantaneous voltage applied to the lead. When these polarities are opposite, energy must flow from the load back to the source. If the inverter control does not provide for this mode of operation, the applied voltage and resulting load current become severely distorted from the desired sinusoidal wave form.

SUMMARY OF THE INVENTION

According to one aspect of the invention, current source/sink means are provided to feed current to, and accept current from an AC load under control of a feed-back means which is responsive to deviation of the voltage wave form fed to the load in comparison to the desired output voltage wave form, the current source and sink means being operative in alternation at a frequency which is high compared to that of the reference wave form. Preferably, the feedback control operates in accordance with a function of the instantaneous error between the actual output voltage and the reference voltage, which function includes a term corresponding to the rate of change of error so that the corrective action includes an element of anticipation for more accurate tracking with the reference signal. According to another aspect of the invention, positive and negative polarities are provided by the source means and each pole of the source means is connectible to the load through a switch means having bi-directional conductivity characteristics whereby each of the positive and negative source/sink devices can act to force changes in the net current available to the output so as to in turn force changes in the output voltage to cause the same to track the desired output wave form.

According to still another aspect of the invention the output circuit includes a shunt filter capacitor, the charge on which is subject to constant alteration by variations of source/sink current flow to and from the capacitor in the network which comprises the aforesaid source/sink means on the one hand and the useful load across the capacitor on the other hand. According to yet another aspect of the invention the aforesaid output filter comprises an inductor between the source/sink means and the capacitor of the filter operative to absorb potential differences between the source/sink voltages and the desired voltage wave form across the capacitor, in a non-dissipative manner.

Accordingly, it is a principle object of the present invention to provide an improved DC/AC inverter system capable of delivering an AC output of desired wave form to a load.

Still another object of the invention is to provide DC/AC power supply which can accommodate reactive and/or transient loads in an improved manner.

Yet another object of the invention is to provide an improved power supply as aforesaid requiring minimum filtering and yet providing an output which is undistorted with respect to the desired output wave form.

Still another object of the invention is to provide an improved AC power supply as aforesaid which is capable of receiving power back from the load and storing the resulting energy in an essentially dissipationless manner and without requiring transformer coupling to the load.

The foregoing and other objects, features and advantages of the present invention will be apparent from the following description of a preferred embodiment of the invention as illustrated in the accompanying drawings.

DETAILED DESCRIPTION

Figure 1:
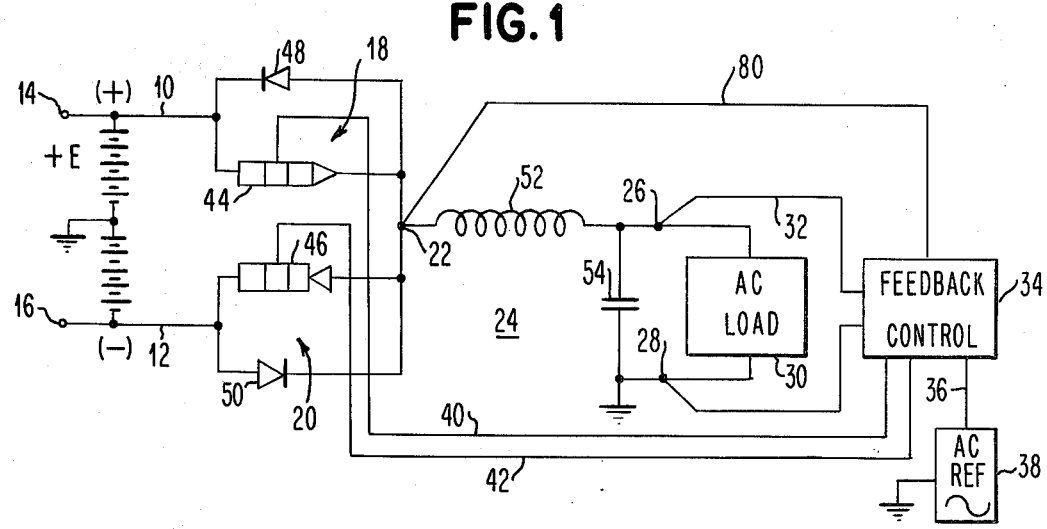
FIG. 1 is a schematic diagram of a DC/AC power supply embodying the invention.

The circuit arrangement of FIG. 1 includes a pair of batteries +E and −E connected across (+) and (−) busses 10, 12. Input terminals 14, 16 are provided to charge batteries +E and −E from an external source such as a rectifier powered from a public utility, a motor-generator set or otherwise. A pair of switches 18, 20 connect busses 10, 12 to the input 22 of filter 24 which, in turn, feeds output terminals 26, 28 to which an AC load 30 may be connected.

A feed-back connection 32 provides a signal corresponding to the output, as one input to a control circuit 34. The other input to control 34 is supplied via line 36 as a voltage signal having the desired output wave form.

For example, line 36 may be energized from an oscillator 38 providing a sinusoidal voltage wave shape on line 36.

Signals at outputs 40, 42 of control 34 represent functions of the relationship of the actual output as sensed at feed-back 32 to the desired output as provided at 36 by oscillator 38. These signals at outputs 40, 42 are utilized to control the switches 18, 20 in such fashion as to cause the output voltage to the load 30 at terminals 26, 28 to track the desired output voltage wave shape.

In the illustrated embodiment of the invention, the switches 18, 20 each comprise a transistor 44, 46 in parallel with a respective diode 48, 50, each diode being poled oppositely with respect to its associated transistor. Accordingly each of the switches 18, 20 can conduct in either direction.

Switch 18 connects +E through transistor 44 to the input 22 of the filter 24 under the control of the base drive connection 40 to transistor 44. On the other hand, the associated diode 48 clamps filter input connection 22 against rising higher than +E. Similarly, switch 20 comprises transistor 46 which, under the control of its transistor base drive connection 42 connects filter input terminal 22 to the (−) buss 12, that is, to −E, and its associated diode 50 clamps terminal 22 against falling below −E.

Thus it will be seen that switches 18, 20 constrain input terminal 22 to a voltage swing within a diode drop (about one volt) of the boundries of +E, −E and are operative to feed current to or accept current from terminal 22 as a result of that constraint and the control function supplied to base drives 40, 42 by the outputs of control 34. In the embodiment of FIG. 1, the total battery capacity is divided into two parts to provide separate positive and negative sources. This permits the switching circuitry to be connected directly between the sources and the output filter, without need for an intervening push pull transformer or other additional elements to effect reversal of the applied source polarity.

Filter 24 comprises a series inductor 52 and a shunt capacitor 54. Capacitor 54 operates to smooth the output and inductor 52 operates as a series impedance to absorb the potential difference between its input terminal 22 and output terminal 26 of the supply, that is to say, the instantaneous potential difference between the +E, −E source/sink attached to terminal 22 and the voltage on filter capacitor 54. In the illustrated embodiment, impedance 52 is an inductor so as to be dissipationless except for its own inherent resistance.

The feedback control 34 of FIG. 1 is adapted to operate switches 18, 20 in accordance with a function of the difference or error between the actual output voltage at output terminals 26, 28 of the supply and the reference signal on line 36. Preferably this function contains a term corresponding to the rate of change of this difference so that corrective action can include an element of anticipation whereby more accurate tracking of the reference signal is facilitated.

Figure 2:
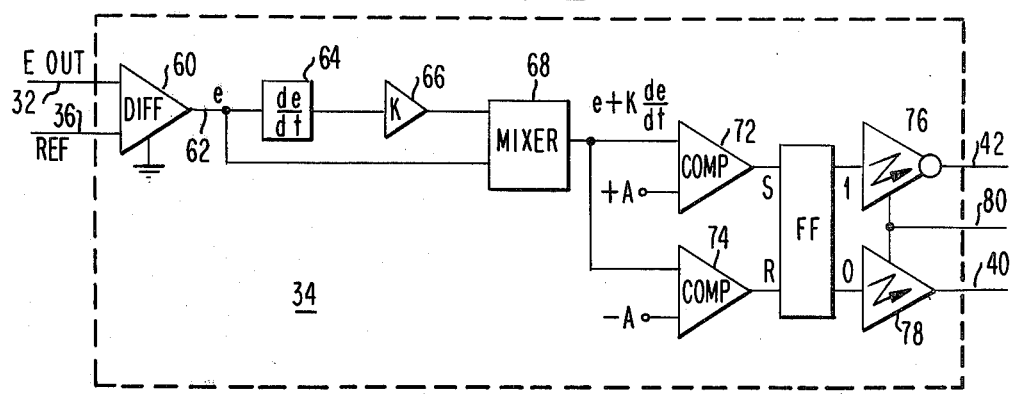
FIG. 2 is a block diagram of a feedback circuit suitable for providing closed loop control in the supply of FIG. 1.

FIG. 2 shows, in diagramatic fashion, logic for providing this function. It will be evident that various control topologies can provide the desired high frequency switching capability for accurate, subcycle tracking of the reference. The showing of FIG. 2 is exemplery of a suitable circuit arrangement.

In the illustrated control, the sense voltage on line 32 from the output terminal 26 of the supply is compared, by a differential amplifier 60, to the reference voltage on line 36 from oscillator 38. The resulting error signal on line 62 is fed to a differentiator circuit 64 and the resulting differential signal is passed through a scaling circuit 66, the output of which is added in a mixer 68 to the raw error signal on line 70. Typically, the maximum value of the scaled differential component K (de/dt) should be in the order of the maximum expected magnitude of the error signal e. The resulting signal e+K (de/dt) is fed to two comparators 72, 74 in which it is compared respectively to threshold potentials +A and −A. Potentials +A and −A may be supplied from any suitable bias source, not shown. For a 120 volt rms output supply +A and −A may be in the order of 1 volt. These thresholds provide a "dead band", the width of which operates, in conjunction with the other parameters of the supply, to control the subcycle frequency at which the inverter follows the reference wave shape. Typically, this subcycle frequency may be in the order of fifty times the fundamental output frequency of the supply. The use of a "dead band" to control the subcycle frequency is given as an example; other means to limit this frequency could be substituted, such as a timing circuit setting a minimum "on" time for the transistors of switches 18, 20. The outputs of comparators 72 and 74 are passed to the set and reset inputs, respectively, of latch or flip-flop FF. When e+K (de/dt) is more positive than +A, latch FF is set. When it is more negative than −A, latch FF is reset. The "1" and "0" outputs of latch FF are connected respectively to isolator circuits 76, 78, the outputs of which are connected to the base drive lines 40, 42 of transistors 44, 46 of switches 18, 20. The isolator circuits 76, 78 may be, for example, LED/phototransistor DC decoupling devices which permit reference of the base drive signals on lines 40, 42 to the emitters of transistors 44, 46 via line 80 connected to terminal 22. Since, in the illustrated embodiment, transistors 44, 46 are of opposite conductivity types, the output of decoupling circuit 76 may be of an inverting type. Alternatively, both of the base drives could be connected to one of the decoupling circuits such as decoupling circuit 76 in which case a "1" output of latch FF would serve to provide base drive to transistor 46 and off drive to transistor 44, and vice versa.

Figure 3:
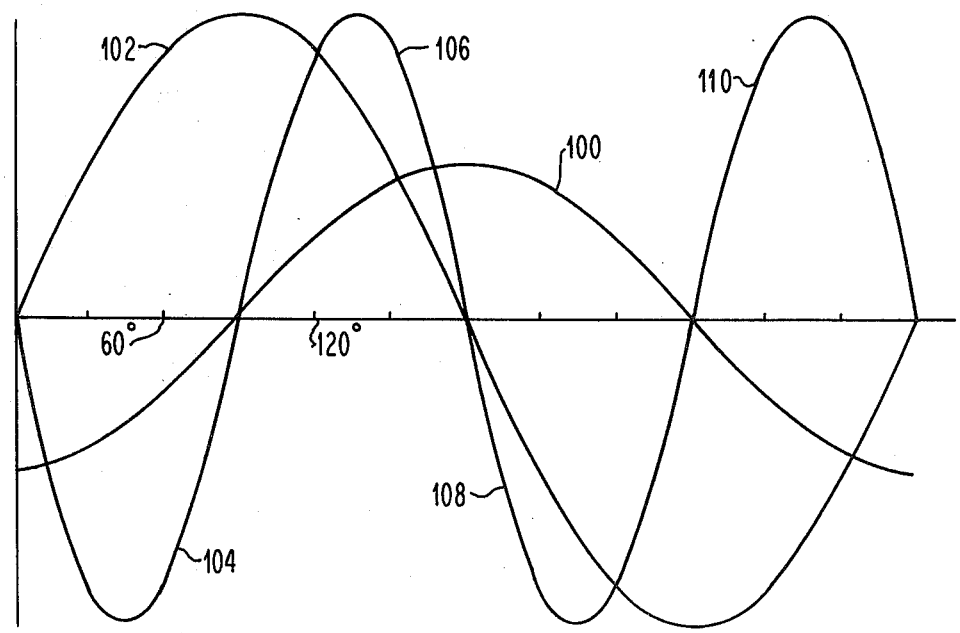
FIG. 3 is illustrative of the voltage, current and power wave forms of a zero power factor load, illustrating an extreme example of the reverse energy flow problem encountered in powering AC loads.

Operation of the illustrated supply will now be described with reference to the remaining figures of the drawings. FIG. 3 illustrates a problem presented to a solid state inverter by a highly reactive load, in the illustrated figure, a hypothetical purely inductive load powered by a sinusoidal AC potential. In this case, the load current 100 lags the applied potential 102 by 90°. The corresponding power flow is the result of the instantaneous product of the voltage and current at the load. Thus, from zero to 90°, that product has a negative sign and energy flows from the load to the source as indicated at 104. From 90° to 180°, the product is positive and the energy flow is toward the load as indicated at 106. Similarly, the energy flow direction is toward the source in the third quadrant of the cycle as indicated at 108 and is toward the load in the forth quadrant as shown at 110. In this example, the net power output is zero and the supply would be required to transfer energy back to the source substantially as much as it is to transfer energy from the source to the load.

Figure 4:
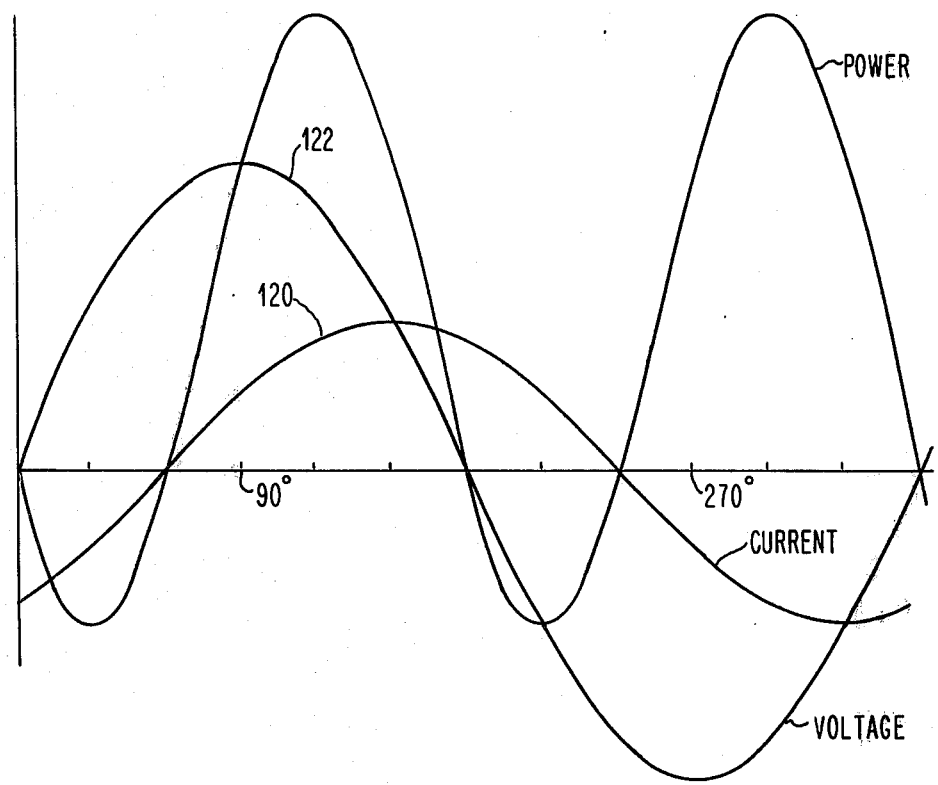
FIG. 4 is a diagram showing the relationship of current, voltage and power in a more typical 60° lagging load.

In the more typical situation illustrated in FIG. 4, the load current 120 lags the output voltage 122 by 60°; thus the supply must act as an energy sink from zero to 60° and from 180° to 240° and as a source from 60° to 180° and from 240° to 360°. In order for the output voltage 122 to rise as it does from 0° to 60°, capacitor 54 must charge. Accordingly, part of the current 120 which is accepted from the load during that period goes to charging capacitor 54 and the remainder must pass through inductor 52 and be accepted by the inverter circuitry connected to terminal 22 of the filter. From 60° to 90°, current is required from the source to provide both the growing positive output current 120 and that current which is needed to additionally charge capacitor 54 to its peak positive voltage. Thereafter, from 90° to 150° the charge on capacitor 54 decreases as shown by output voltage curve 122, yielding a net outward current from capacitor 54 which combines with current from the source through inductor 52 to support the rising load current 120. In other words, capacitor 54 has the effect of reducing the degree by which current to and from the inverter through inductor 52 lags the output voltage. This is taken care of automatically in the supply of FIG. 1, since the current flow in inductor 52 is adjusted automatically to track the desired output voltage wave form.

Figure 5:
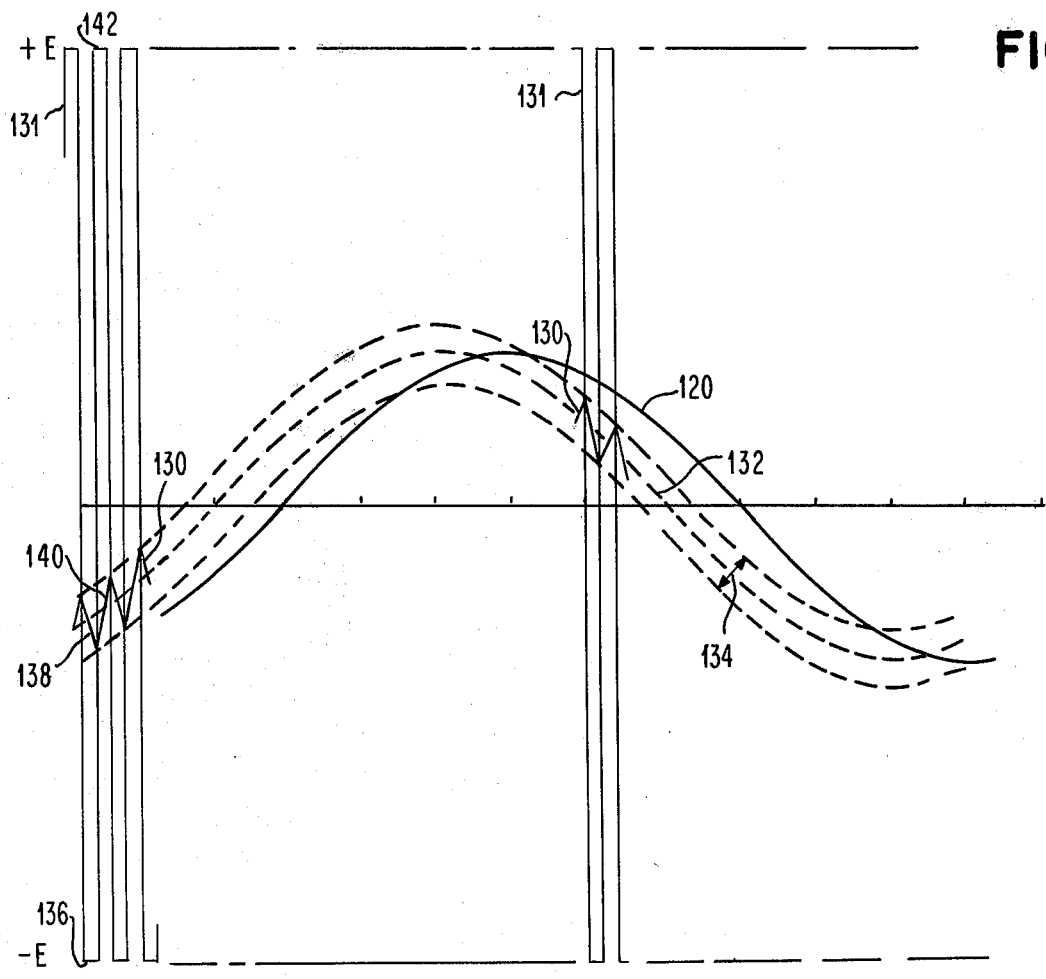
FIG. 5 is illustrative of the source and sink functions of the current supply portion of the circuit arrangement of FIG. 1 in providing the needed energy transfers to power a load having the characteristics of FIG. 4, without output wave form distortion.

FIG. 5 is a fragmentary diagramatic showing of wave form 130 of the current through inductor 52, and the voltage 131 at terminal 22 thereof as the switches 18, 20 operate to control the current. As shown, the current hunts about a smoothed or median value 132 required to support the parallel network of load 30 and filter capacitor 54. For clarity of illustration, the width of the "dead band" 134 set by threshold levels +A, −A (FIG. 2), the period of oscillation about median value 132, and the amount of which median value 132 leads load current 120 are exagerated in FIG. 5.

When the output voltage sensed at 30, FIG. 1 exceeds the instantaneous value of the reference wave form on line 36, control 34 (after allowing for the effect of +A and K (de/dt)) operates to turn off transistor 44 and fully turn on transistor 46. Thus terminal 22, which had been connected to the voltage of positive bus 10 is now connected to the −E voltage of bus 12, as shown at 136. If, at the moment, (with transistor 46 on) the current in inductor 52 is negative, that is toward terminal 22, then this negative current will flow through transistor 46 and tend to increase. A situation of this kind is seen at 138, 136, FIG. 5. With the capacitor voltage positive and the load current negative (compare FIG. 4), this action will tend to decrease the charge on capacitor 54 until the output voltage sensed by feedback 32 is slightly below the reference 38 wave form whereupon the control 34 will reverse and transistor 46 will be turned off and transistor 44 will be turned on. The (negative) current through inductor 52 toward terminal 22 will cause the voltage at 22 to rise and will be diverted through clamping diode 48 to +E bus 10. This action will tend to reduce the magnitude of the negative inductor current and is seen for example at 140, 142, FIG. 5.

Thus it will be seen that when the inductor current is negative, it is really transistor 46 which controls and diode 48 which clamps. When the current reverses and is positive, it is really transistor 44 which controls and diode 50 which clamps. In some switching networks, it may be desireable to signal this reversal of roles by a zero crossing detector for the inductor current. This is particularly desireable for a thyristor switch. However, in the illustrated transistor circuit the control is simpler and this function is purely automatic. The diodes conduct whenever forward biased, and no harm is done in supplying forward base drive to the switching transistors whenever the feedback circuit so dictates, assuming, of course, provision of sufficient impedance or other current limiting means in the base drive circuits to prevent excessive collector-base current.

When current flows from terminal 22 through diode 48 to bus 10, battery +E is charged. Similarly when current flows through diode 50, battery −E is charged. Thus when the potential and current values at terminal 22 are opposite in sign, energy is stored back in the supply batteries (or in any other energy absorbing devices which are connected across terminals 14, 16. At other times, battery +E or −E and/or other supply devices connected across input terminals 14, 16 supply energy to the combination of capacitor 54 and load 30. The operation of the switches 18, 20 is controlled by the feedback circuit to vary the +E, −E on time ratio automatically to effect this energy flow. The values of +E and −E should exceed the peak AC output at terminals 26, 28 substantially, so that adequate potential difference is available across inductor 52 for fast responses. Typically +E and −E would be in the order of 250 volts for a 120 volt rms supply.

In the foregoing discussions, sinusoidal wave forms are assumed. This will result when reference 38 is sinusoidal and the load 30 is a constant state AC load. However, the circuit of FIG. 1 can supply non-linear loads (loads with rapid, non-sinusoidal current pulses or steps) as well. The feedback circuit will force current into or draw current from capacitor 54 in the amounts required to track the reference voltage wave form. In the same manner, a non-sinusoidal wave form can be utilized as the reference 38, and in such case currents will be supplied or drawn by the inverter to cause the output at terminals 26, 28 to track that wave form as well.

The design for the inductance L in henries of the inductor 52 is based on the di/dt required. The di/dt value is found by adding the maximum value of di/dt required by load 30 to the di/dt requirement of the filter capacitor 54 at the point in the wave form where the maximum di/dt of the load is required. Then, $$L = (E - E_{out})/di/dt$$

at the time of the maximum di/dt of the load.

The design for the filter capacitor 54 is a function of the ripple voltage requirement. An approximate value for the capacity C in farads of capacitor 54, ignoring resistances in the filter 24, can be found as follows:

T = Time of ½ cycle of output voltage
P = The sum of plus E to minus E and minus E to plus E voltage switchovers per half-cycle, of output frequency, full load
ΔE = Maximum peak to peak ripple voltage allowed
$I_p$ = Peak filter inductor current at full load.

$$C = I_p(T/P)/\Delta E$$

Various substitutions and modifications will be apparent to those skilled in the art. For example, thyristor or even electro-mechanical switches could be substituted for the transistor-diode switches 18, 20. One example of a suitable thyristor switch is shown in the IBM Technical Disclosure Bulletin, Vol. 16, No. 9 (February 1974), page 2926-2927. Also, while a purely AC output, based on a purely AC reference, has been illustrated, it will be understood that the reference and the output could have a DC component if desired. This is particularly facilitated by the direct coupling to the output, without an intervening transformer, facilitated by the +E, −E source and switching arrangement illustrated.

Thus, while the invention has been particularly shown and described with reference to a preferred embodiment thereof, it will be understood by those skilled in the art that various changes in form and detail can be made without departing from the spirit and scope of the invention.

What is claimed is:

1. A power supply comprising:
   direct current source/sink means,
   a pair of output terminals for connection to a load,
   bi-directional circuit means connected between said source/sink means and said output terminals;
   voltage reference means having an output wave form comprising at least an alternating current component,
   and feedback means responsive to deviation of the voltage across said output terminals in comparison to the wave form of said reference,
   the current source/sink means being responsive to said feedback means to feed current to and accept current from said circuit means, the source/sink means being operative in alternation at a frequency which is high compared to that of said reference wave form,
   wherein said feedback means is operative to provide a feedback signal having a first component which is directly proportional to the error between the voltage across said output terminals and the voltage signal provided by said reference means, and
   a second component which is proportional to the first derivative of said error with respect to time whereby said feedback signal includes an element of anticipation so that more accurate tracking with the reference signal is facilitated.

2. A power supply in accordance with claim 1, wherein
   said source/sink means comprises a DC source having positive and negative poles and bidirectional switch means arranged to connect said poles to said circuit means in alternation.

3. A supply in accordance with claim 2, wherein one of said output terminals is a return terminal and said DC source means comprises a pair of storage batteries connected between said return terminal and said switch means in opposite relative polarity, said switch means being operative to connect said storage batteries to said circuit means in alternation.

4. A supply in accordance with claim 3, wherein said circuit means comprises filter means having a shunt capacitor.

5. A supply in accordance with claim 3, wherein said circuit means comprises an inductor connected between said switch means and the other of said output terminals and a capacitor connected in shunt relation to said output terminals.

6. A power supply comprising:
   direct current storage battery means,
   a pair of output terminals for connection to an alternating current load,
   circuit means connected between said storage battery means and said output terminals;
   said circuit means comprising filter means connected to said output terminals and switch means connected between said battery means and said filter means,
   predetermined wave form alternating current voltage reference means,
   and feedback means connected to said output terminals and to said reference means and responsive thereto to provide a feedback signal which is a function of deviation of the voltage waveform across said output terminals from the wave form of said reference,
   said switch means being connected to said feedback means to be responsive to said feedback signal to feed current to and accept current from said filter means, said battery means being operative under the control of said switch means to feed current to and accept current from said filter means in alternation at a frequency which is high compared to that of said reference wave form,
   wherein said feedback means is operative to provide a feedback signal having a first component which is directly proportional to the error between the voltage across said output terminals and the voltage signal provided by said reference means, and
   a second component which is proportional to the first derivative of said error with respect to time whereby said feedback signal includes an element of anticipation so that more accurate tracking with the reference signal is facilitated.

7. A supply in accordance with claim 6, wherein one of said output terminals is a return terminal and said battery means comprises a pair of storage batteries connected between said return terminal and said switch means in opposite relative polarity, said switch means being operative to connect said storage batteries to said circuit means in alternation.

8. A supply in accordance with claim 7, wherein said circuit means comprises an inductor connected between said switch means and the other of said output terminals and a capacitor connected in shunt relation to said output terminals.

* * * * *